(12) United States Patent
Riley et al.

(10) Patent No.: US 7,446,706 B2
(45) Date of Patent: Nov. 4, 2008

(54) METHOD AND APPARATUS FOR PROCESSING NAVIGATION DATA IN POSITION DETERMINATION

(75) Inventors: Wyatt T. Riley, King of Prussia, PA (US); Christopher Patrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/608,163

(22) Filed: Dec. 7, 2006

(65) Prior Publication Data

US 2007/0109192 A1 May 17, 2007

Related U.S. Application Data

(62) Division of application No. 10/690,175, filed on Oct. 20, 2003, now Pat. No. 7,170,447.

(60) Provisional application No. 60/447,506, filed on Feb. 14, 2003, provisional application No. 60/493,536, filed on Aug. 7, 2003.

(51) Int. Cl.
G01S 3/02 (2006.01)
G01S 5/14 (2006.01)
(52) U.S. Cl. .................. 342/450; 342/357.02; 342/451
(58) Field of Classification Search ................. 342/451, 342/450, 357.02
See application file for complete search history.

(56) References Cited

U.S. PATENT DOCUMENTS

| | | | | |
|---|---|---|---|---|
| 5,185,529 | A * | 2/1993 | Smith et al. | 250/369 |
| 5,311,195 | A | 5/1994 | Mathis et al. | |
| 5,317,514 | A | 5/1994 | Bancroft et al. | 701/214 |
| 5,808,581 | A * | 9/1998 | Braisted et al. | 342/357.02 |
| 5,812,087 | A | 9/1998 | Krasner | |
| 5,841,396 | A | 11/1998 | Krasner | |
| 5,874,914 | A | 2/1999 | Krasner | |
| 5,936,572 | A * | 8/1999 | Loomis et al. | 342/357.07 |
| 5,945,944 | A | 8/1999 | Krasner | |
| 5,999,124 | A | 12/1999 | Sheynblat | |
| 5,999,126 | A | 12/1999 | Ito | |
| 6,061,018 | A | 5/2000 | Sheynblat | |
| 6,208,290 | B1 | 3/2001 | Krasner | |
| 6,215,442 | B1 | 4/2001 | Sheynblat et al. | |
| 6,236,354 | B1 | 5/2001 | Krasner | |

(Continued)

OTHER PUBLICATIONS

International Search Report-PCT/US04/04597-International Search Authority- Mar. 22, 2005 (2 pages).

*Primary Examiner*—Gregory C Issing
(74) *Attorney, Agent, or Firm*—Andrea L. Mays; James D. McFarland; Thomas R. Rouse

(57) ABSTRACT

Methods and apparatuses for the processing of false alarms in position determination. At least one embodiment of the present invention estimates and uses measurement false alarm probabilities in the position determination process. In one embodiment, the estimated measurement false alarm probabilities are combined to determine the reliability of the determined position solution or the reliability of the set of measurements as a collection. In one embodiment, the estimated measurement false alarm probabilities are used in the isolation and elimination of faulty measurements. For example, the traditional geometry based metric for identifying a faulty measurement is further weighted according to the measurement false alarm probabilities in order to determine the faulty measurement.

20 Claims, 9 Drawing Sheets

U.S. PATENT DOCUMENTS

| | | |
|---|---|---|
| 6,249,245 B1 | 6/2001 | Watters et al. |
| 6,480,784 B2 | 11/2002 | Mizuno |
| 6,486,831 B1 | 11/2002 | Martrana et al. |
| 6,691,066 B1 | 2/2004 | Brodie |
| 2002/0132626 A1* | 9/2002 | Tsunehara et al. .......... 455/456 |
| 2003/0130987 A1 | 7/2003 | Edlund et al. |

\* cited by examiner

METHOD AND APPARATUS FOR PROCESSING NAVIGATION DATA IN POSITION DETERMINATION

RELATED APPLICATIONS

This application is a divisional of U.S. patent application Ser. No. 10/690,175, filed on Oct. 20, 2003, now U.S. Pat. No. 7,170,447 which claims priority to U.S. Provisional Application No. 60/447,506, filed Feb. 14, 2003, and U.S. Provisional Application No. 60/493,536, filed on Aug. 7, 2003.

FIELD OF THE INVENTION

The invention relates to position determination systems, and more particularly to the processing of false alarms.

BACKGROUND

To perform position location in wireless cellular networks (e.g., a cellular telephone network), several approaches perform triangulation based upon the use of timing information sent between each of several base stations and a mobile device, such as a cellular telephone. One approach, called Advanced Forward Link Trilateration (AFLT) or Enhanced Observed Time Difference (EOTD), measures at the mobile device the times of arrival of signals transmitted from each of several base stations. These times are transmitted to a Position Determination Entity (PDE) (e.g., a location server), which computes the position of the mobile device using these times of reception. The transmit times at these base stations are coordinated such that at a particular instance of time, the times-of-day associated with multiple base stations are within a specified error bound. The accurate positions of the base stations and the times of reception are used to determining the position of the mobile device.

FIG. 1 shows an example of an AFLT system where the times of reception (TR1, TR2, and TR3) of signals from cellular base stations 101, 103, and 105 are measured at the mobile cellular telephone 111. This timing data may then be used to compute the position of the mobile device. Such computation may be done at the mobile device itself, or at a location server if the timing information so obtained by the mobile device is transmitted to the location server via a communication link. Typically, the times of receptions are communicated to a location server 115 through one of the cellular base stations (e.g., base station 101, or 103, or 105). The location server 115 is coupled to receive data from the base stations through the mobile switching center 113. The location server may include a base station almanac (BSA) server, which provides the location of the base stations and/or the coverage area of base stations. Alternatively, the location server and the BSA server may be separate from each other; and, the location server communicates with the base station to obtain the base station almanac for position determination. The mobile switching center 113 provides signals (e.g., voice communications) to and from the land-line Public Switched Telephone System (PSTS) so that signals may be conveyed to and from the mobile telephone to other telephones (e.g., land-line phones on the PSTS or other mobile telephones). In some cases the location server may also communicate with the mobile switching center via a cellular link. The location server may also monitor emissions from several of the base stations in an effort to determine the relative timing of these emissions.

In another approach, called Time Difference of Arrival (TDOA), the times of reception of a signal from a mobile device is measured at several base stations (e.g., measurements taken at base stations 101, 103 and 105). FIG. 1 applies to this case if the arrows of TR1, TR2, and TR3 are reversed. This timing data may then be communicated to the location server to compute the position of the mobile device.

Yet a third method of doing position location involves the use in the mobile device of a receiver for the United States Global Positioning Satellite (GPS) system or other Satellite Positioning System (SPS), such as the Russian GLONASS system and the proposed European Galileo System, or a combination of satellites and pseudolites. Pseudolites are ground-based transmitters, which broadcast a PN code (similar to a GPS signal) modulated on an L-band carrier signal, generally synchronized with SPS time. Each transmitter may be assigned a unique PN code so as to permit identification by a remote receiver. Pseudolites are useful in situations where SPS signals from an orbiting satellite might be unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites. Such a method using a receiver for SPS signals may be completely autonomous or may utilize the cellular network to provide assistance data or to share in the position calculation. As shorthand, we call these various methods "SPS". Examples of such methods are described in U.S. Pat. Nos. 6,208,290; 5,841,396; 5,874,914; 5,945,944; and 5,812,087. For instance, U.S. Pat. No. 5,945,944 describes a method to obtain from cellular phone transmission signals accurate time information, which is used in combination with SPS signals to determine the position of the receiver; U.S. Pat. No. 5,874,914 describes a method to transmit the Doppler frequency shifts of in view satellites to the receiver through a communication link to determine the position of the receiver; U.S. Pat. No. 5,874,914 describes a method to transmit satellite almanac data (or ephemeris data) to a receiver through a communication link to help the receiver to determine its position; U.S. Pat. No. 5,874,914 also describes a method to lock to a precision carrier frequency signal of a cellular telephone system to provide a reference signal at the receiver for SPS signal acquisition; U.S. Pat. No. 6,208,290 describes a method to use an approximate location of a receiver to determine an approximate Doppler for reducing SPS signal processing time; and, U.S. Pat. No. 5,812,087 describes a method to compare different records of a satellite data message received at different entities to determine a time at which one of the records is received at a receiver in order to determine the position of the receiver. In practical low-cost implementations, both the mobile cellular communications receiver and the SPS receiver are integrated into the same enclosure and, may in fact share common electronic circuitry.

In yet another variation of the above methods, the round trip delay (RTD) is found for signals that are sent from the base station to the mobile device and then are returned. In a similar, but alternative, method the round trip delay is found for signals that are sent from the mobile device to the base station and then returned. Each of these round-trip delays is divided by two to determine an estimate of the one-way time delay. Knowledge of the location of the base station, plus a one-way delay constrains the location of the mobile device to a circle on the earth. Two such measurements from distinct base stations then result in the intersection of two circles, which in turn constrains the location to two points on the earth. A third measurement (even an angle of arrival or cell sector) resolves the ambiguity.

A combination of either the AFLT or TDOA with an SPS system is called a "hybrid" system. For example, U.S. Pat. No. 5,999,124 describes a hybrid system, in which the position of a cell based transceiver is determined from a combination of at least: i) a time measurement that represents a time of travel of a message in the cell based communication signals between the cell based transceiver and a communication system; and, ii) a time measurement that represents a time of travel of an SPS signal.

Altitude aiding has been used in various methods for determining the position of a mobile device. Altitude aiding is typically based on a pseudo-measurement of the altitude. The knowledge of the altitude of a location of a mobile device constrains the possible positions of the mobile device to a surface of a sphere (or an ellipsoid) with its center located at the center of the earth. This knowledge may be used to reduce the number of independent measurements required to determine the position of the mobile device. For example, U.S. Pat. No. 6,061,018 describes a method where an estimated altitude is determined from the information of a cell object, which may be a cell site that has a cell site transmitter in communication with the mobile device.

When a minimum set of measurements are available, a unique solution to the navigation equations can be determined for the position of the mobile station. When more than one extra measurement is available, the "best" solution may be obtained to best fit all the available measurements (e.g., through a least square solution procedure that minimizes the residual vector of the navigation equations). Since the residual vector is typically non-zero when there are redundant measurements, due to the noises or errors in the measurements, an integrity-monitoring algorithm can be used to determine if all the measurements are consistent with each other. For example, a traditional Receiver Autonomous Integrity Monitoring (RAIM) algorithm may be used to detect if there is a consistency problem in the set of the redundant measurements. For example, one RAIM algorithm determines if the magnitude of the residual vector for the navigation equations is below a threshold value. If the magnitude of the residual vector is smaller than the threshold, the measurements are considered consistent. If the magnitude of the residual vector is larger than the threshold, there is an integrity problem, in which case one of the redundant measurements that appears to cause the most inconsistency may then be removed to obtain an improved solution.

SUMMARY OF THE DESCRIPTION

Methods and apparatuses for the processing of false alarms in position determination are described here. Some of the embodiments of the present invention are summarized in this section.

At least one embodiment of the present invention estimates and uses measurement false alarm probabilities in the position determination process. In one embodiment, the estimated measurement false alarm probabilities are combined to determine the reliability of the determined position solution or the reliability of the set of measurements as a collection. In one embodiment, the estimated measurement false alarm probabilities are used in the isolation and elimination of faulty measurements. For example, the traditional geometry based metric for identifying a faulty measurement is further weighted according to the measurement false alarm probabilities in order to determine the faulty measurement.

In one aspect of the present invention, a method of position determination for a mobile station includes: determining a first measurement (e.g., a time of arrival of a GPS or base station signal, a pseudorange) for position determination for the mobile station from position determination signals received at the mobile station; and determining a first reliability indicator from the signals for the first measurement, where the first reliability indicator represents a level of measurement false alarm probability for the first measurement. In one example, a reliability level is determined from the first reliability indicator to represent a probability that a position solution calculated (e.g., at the mobile station, a remote server) for the mobile station using the measurement is not false. In one example, the first measurement and the first reliability indicator are transmitted to a remote server for position determination of the mobile station. In one example, one or more signal quality indicators, which are determined from the signals for the first measurement, are transmitted from the mobile station to a remote server; and, the first reliability indicator is determined at the remote server using the one or more signal quality indicators. In one example, a second measurement is determined from position determination signals received at the mobile station; a second reliability indicator is determined from position determination signals for the second measurement to represent a level of measurement false alarm probability for the second measurement; a position solution is calculated for the mobile station using the first and second measurements; and the first and second reliability indicators are combined to determine a reliability of the position solution. In one example, when the measurements are not consistent, one of the first and second measurements is eliminated from position determination using the first and second reliability indicators. In one example, the first reliability indicator is determined from at least one of: a) magnitude of a correlation peak; b) correlation peak width; c) signal strength; d) signal to noise ratio; e) signal to interference ratio; f) relationship of a correlation peak used for determination of the first measurement with one or more candidate peaks; and g) relationship of signals for determination of the first measurement with detected signals.

In one aspect of the present invention, a method of position determination for a mobile station includes: combining a plurality of measurement false alarm indicators to determine a reliability of a position calculated using a plurality of measurements, where the plurality of measurement false alarm indicators represent levels of a priori false alarm probability for the plurality of measurements respectively. In one example, the position for the mobile station is calculated using the plurality of measurements; each of the plurality of measurement false alarm indicators is a value of more than two levels (e.g., a number within a range, such as between 0 and 1). In one example, one of the plurality of measurement false alarm indicators is determined from one or more signal quality indicators (e.g., a) magnitude of a correlation peak; b) correlation peak shape indicator; c) signal strength; d) signal to noise ratio; and e) signal to interference ratio).

In one aspect of the present invention, a method of position determination for a mobile station includes: eliminating one of a plurality of measurements from position determination using a plurality of a priori false alarm indicators in response to a determination that the plurality of measurements are not consistent, where the plurality of a priori false alarm indicators are determined respectively for the plurality of measurements individually. In one example, the eliminated one of the plurality of measurements is determined from comparing the plurality of a priori false alarm indicators. In one example, a plurality of inconsistency indicators are determined for the plurality of measurements respectively from the plurality of measurements; and, the eliminated one of the plurality of measurements is determined from weighting the plurality of inconsistency indicators according to the plurality of a priori false alarm indicators respectively. In one example, whether or not an inconsistency level among the plurality of measurements is above a threshold is determined; and the plurality of a priori false alarm indicators are determined from signals used for determination of the plurality of measurements respectively.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
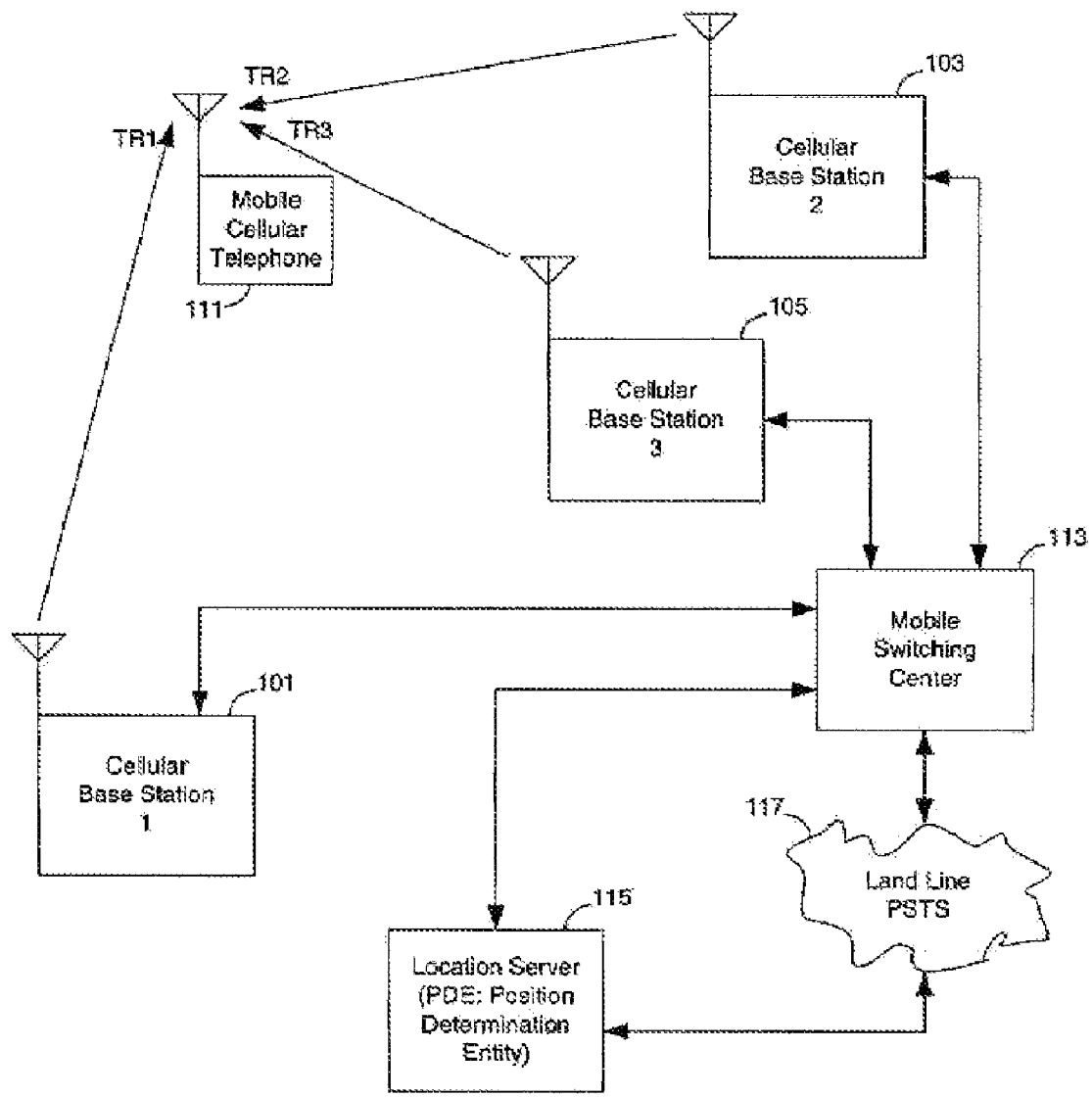
FIG. 1 shows an example of a prior art cellular network which determines the position of a mobile cellular device.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessary to the same embodiment; and, such references means at least one.

At least one embodiment of the present invention seeks to estimate and use measurement false alarm probabilities in the position determination process.

In the determination of the position of a mobile station or other device, a position calculation typically uses a number of geometrically distinct measurements, such as range, pseudorange, round trip delay and others that are associated with distinct reference points (e.g., GPS satellites, pseudolites, base stations, surface of the earth). An obtained measurement may be in fact a false alarm, which is typically caused by a poor signal condition such that an irrelevant signal is mistakenly identified for the determination of the measurement.

There are many conditions that can cause false alarms. For example, in acquiring a GPS signal, a local reference signal with a pseudorandom noise code is correlated with the received GPS signals. The correlation output reaches a peak when the timing of the local reference signal and the GPS signal of the same pseudorandom noise code matches. A pseudorange is then determined from the timing of the reference pseudorandom noise code. When the signal strength is low, a noise spike (e.g., due to the thermal noises) in the correlation output may be selected as a measurement, causing a false alarm. Typically, a correlation peak that is above a threshold is selected for the determination of a pseudorange. The threshold is typically designed so that the probability of false alarm when a peak is above the threshold is below a specified level. To reduce the probability of false alarm, a high threshold may be used. However, since the correlation peaks below the threshold are ignored, the high threshold reduces the measurement availability when the signal strength is low.

Signal interference can also cause false alarms. For example, the local reference signal may cross correlate with a strong GPS signal of a different pseudorandom noise code. The correlation output of the signals with different pseudorandom noise code typically has small correlation peaks. When the cross correlated GPS signal is strong while the GPS signal to be acquired is relatively weak, these cross correlation peaks may be above the threshold, causing false alarms. Similarly, when the GPS signal with the same pseudorandom noise code is very strong, the small correlation peaks occurred at a number of different timing differences in auto correlation may also be above the threshold, causing false alarms. The relationship of the GPS signals used for the determination of an obtained measurement with other detected GPS signals can be used in the estimation of the probability of false alarms due to cross correlation.

Multi-path signals can also cause false alarms. The reflection of a GPS signal through a different path causes additional delay. In some cases, the indirect GPS signal may be stronger than the direct GPS signal. Thus, when the direct GPS signal is weak, the multi-path signals may be used for determination of the measurement. Since the multi-path signal arrives later than the direct signal, the relationship of the correlation peak used for the determination of an obtained measurement with one or more candidate peaks can be used in the estimation of the probability of false alarms. Further, multi-path signals may change the shape of a correlation peak (e.g., the width of a correlation). Thus, a measurement of the shape of the correlation peak can also be used as a signal quality indicator in the determination of the probability of false alarms.

Further, interference from some other signal sources (e.g., jammer, or communication signals) may also cause false alarms. Thus, a number of signal quality indicators (e.g., correlation peak magnitude, signal to noise ratio, signal to interference ratio, signal strength, relationship of a correlation peak with candidate peaks, relationship of signals for measurement with other detected signals, and others) can be used for the determination of the false alarm probabilities according to embodiments of the present inventions. In the design of a traditional receiver, some of the signal quality indicators have been used in the determination of threshold values (e.g., correlation output threshold) such that the obtained measurements that meet these thresholds have a false alarm probability small than a target value. In one embodiment of the present invention, a number of different levels of threshold values are used to estimate the false alarm probabilities for individual measurements. These a priori false alarm probabilities are estimated without combining different geometrically distinct measurements that are associated with different reference points (e.g., different GPS satellites or base stations). These a priori false alarm probabilities are based on the statistical data, not on the consistency between different and distinct geometric measurements. In one embodiment of the present invention, different levels of threshold values are used to estimate the discrete levels of false alarm probabilities. In one embodiment, an interpolation scheme is used to determine the false alarm probabilities based on the measured signal quality indicators (e.g., using an empirical formula). The relation between the false alarm probabilities and the signal quality indicators can be obtained from various approaches known in the art, such as from collecting statistical data, numerical modeling, numerical simulation, analytical analysis, and others.

In additional to the range information (e.g., the pseudorange), other types of measurements may also be false alarms. For example, the identity of a base station may be an error from base station lookup operations. Some base stations have the same identification strings. Thus, there is a chance that the base station is mistakenly identified. Currently, base station lookups use the probabilities of being correct in their determination. These probabilities can be further used in embodiments of the present invention.

In a traditional system, the measurements are individually required to meet a minimum threshold of reliability so that the chances of the measurements as false alarms are smaller enough in order to use the measurements in the position determination calculation. If the measurement does not meet the reliability threshold, the measurement is discarded as a false alarm (or the measurement is not made at all, e.g., when the correlation peaks are below the threshold). Thus, the traditional system uses the measurement in the calculation of the position only if the measurement meets a strict reliability threshold.

At least one embodiment of the present invention uses a more complete approach to estimate and use various degrees of measurement reliability in a navigation solution. The probabilities of individual measurements as false alarms (or the converse, the measurement reliabilities) are estimated and used in the position calculation stage to determine the probability that the position itself is false. In one embodiment, the estimate of a false alarm probability is expressed as a valued between 0 or 1 for both measurement and the final position calculation. In one embodiment, the estimation of measurement false alarm probability is performed at the source of the measurement (e.g., an SPS receiver) and transmitted to a remote server along with the associated measurements for position determination. The server may further refine the false alarm probability estimates (e.g., using information available at the server) before using the values in position determination.

Typically, a false alarm measurement and a corresponding non-false alarm measurement have very different probability distributions. If a measurement of a parameter is not a false alarm, the measurement typically has a probability distribution that is concentrated in a small range near the true value of the parameter (e.g., according to a Gaussian distribution). However, if the measurement is a false alarm, the measurement typically has a probability distribution over a wide range around the true value of the parameter to be measured (e.g., a relative uniform distribution).

Figure 4:
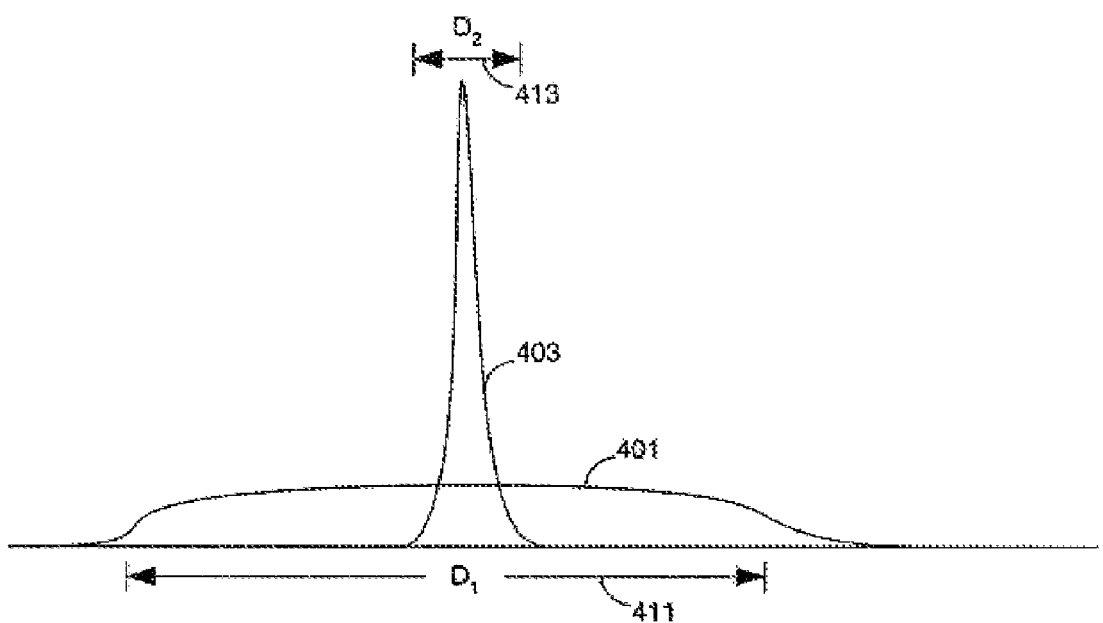
FIG. 4 shows examples of different probability distributions for false alarms and for normal measurements, which may be used in the present invention.

FIG. 4 shows examples of different probability distributions for false alarms and for normal measurements, which may be used in the present invention. In FIG. 4, curve 401 shows a distribution of a measurement (e.g., pseudorange) if it is a false alarm. The false alarm measurement is distributed within a wide range $D_1$ (411). Curve 403 shows a distribution of the measurement when it is not a false alarm. The distribution of the measurement that is not a false alarm is concentrated in a small range $D_2$ (413). One embodiment of the present invention determines a probability of false alarm in view of the relation between the obtained measurements using the distinct distribution patterns of the false alarm measurement and non-false alarm measurement.

For example, when a threshold for a measurement false alarm probability is 0.001, the false alarm probabilities of 0.01 for a first measurement of and 0.02 for a second measurement are significantly worse than the threshold. However, if the first measurement agrees well with the second measurement, the first and second measurements can be combined as one measurement, which is a false alarm only when both of the first and second measurements are false alarm. Thus, if the first and second measurements are independent from each other, the probability of false alarm for the combined measurement is 0.01×0.02=0.0002, which is significantly better than the threshold of 0.001. Thus, these combined measurements of low reliability can be used, when they agree with each other, without compromising the reliability of the solution.

Figure 5:
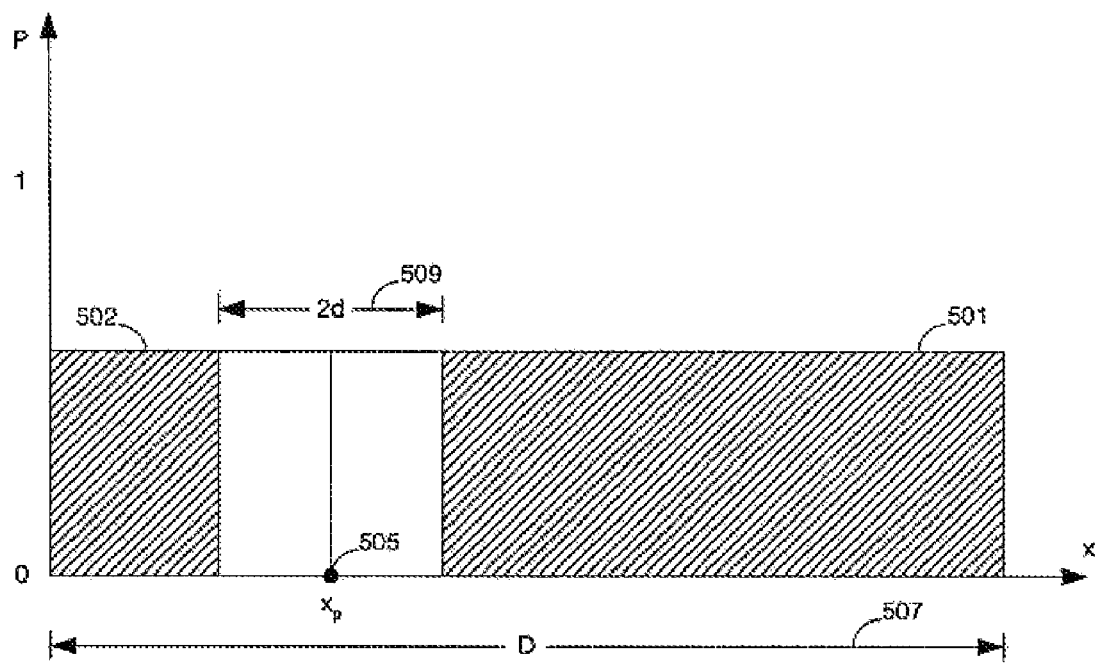
FIG. 5 illustrates a method to determine the probability of two measurements being close to each other, which may be used in the present invention.

FIG. 5 illustrates a method to determine the probability of two measurements being close to each other, which may be used in the present invention. For illustration purpose, it is assumed that both of the two measurements have the same uniform distribution in the range D (507). When the first measurement is at point $x_p$ (505), the second measurement must be in the range 509 if the second measurement is within a distance d to the first measurement. Thus, from the probability distributions of the first and second measurements, one can obtain the probability that two measurements are within a distance of d. Although FIG. 5 illustrates a situation where the two measurements have the same uniform distribution, from this description, a person skilled in the art will understand that such a probability can be determined for two measurements of the same distribution or different distributions.

Figure 6:
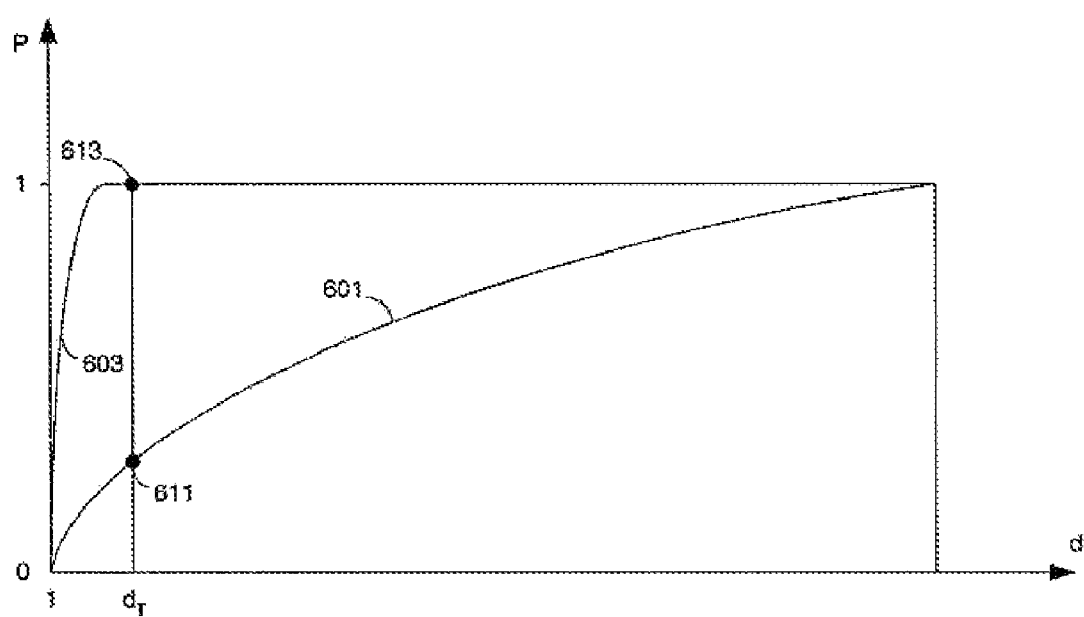
FIG. 6 illustrates a method to determine the probability that two measurements are false alarms according to one embodiment of the present invention.

FIG. 6 illustrates a method to determine the probability that two measurements are false alarms according to one embodiment of the present invention. From the false alarm distribution and the non-false alarm distribution (e.g., curves 401 and 403 in FIG. 4), one can determine respectively the probabilities that both measurements are within a distance of d, as illustrated with FIG. 5. For example, curve 601 shows the probability of two false alarm measurements being within a given distance d; and curve 603 shows the probability of two non-false alarm measurements being within a given distance d. Thus, for a small distance $d_T$, there is a huge difference between the probability of two false alarm measurements being with $d_T$ (at point 611) and the probability of two non-false alarm measurements being with $d_T$. Thus, when two obtained measurements are within a small distance, it is very likely that the two measurements are non-false alarm measurements; when the two obtained measurements are separated apart by a large distance, it is very likely that at least one of the two measurements is a false alarm.

For example, if 1) both a first measurement and a second measurement are determined within [−1,1] if they are not false alarms but within [−1000, 1000] if they are false alarms and 2) both the first and second measurements have a probability of 0.2 as a false alarm, the chance that these two measurements are lined up so precisely, out of sheer luck as false alarms, is very low. Thus, these two measurements are more likely not false alarms. However, if both the first and second measurements have the same probability of 0.2 as a false alarm within [−1000, 1000] but the first measurement is determined to be within [−1,1] and the second measurement within [9,11], the chance of both of the two measurements as non-false alarms is very small, since the two measurements are so far misaligned.

In one embodiment of the present invention, the probability of the two measurements are false alarm measurements when the two measurements are determined to be within a given distance d is determined (or estimated) from the probabilities of the individual measurements as false alarms, the probability of the measurements being within a distance d if the measurements are false alarms, and the probability of the measurements being within a distance d if the measurements are non-false alarms. For example, let $C_d$ represent that the two measurements are within a distance d; F represent that the two measurements are false alarms; and N represent that at least one of the two measurements is not a false alarm, one may use the following expression.

$$P(F|C_d)/P(N|C_d)=[P(C|F)P(F)]/[P(C|N)P(N)]$$

where P(C|F) is the probability of the two measurements being within a distance d when the two measurements are false alarms; P(C|N) is the probability of the two measurements being within a distance d when the two measurements are non-false alarms; P(F) and P(N) are the probabilities of the two measurements being false alarms and not all false alarms respectively; and, $P(F|C_d)$, $P(N|C_d)$ are the probabilities of the two measurements being false alarms and being not all false alarms when the two measurements are within a distance d. P(F), P(N), $P(F|C_d)$ and $P(N|C_d)$ can be determined from the estimated a priori measurement false alarm probabilities and the distributions of the false alarm measurements and the non-false alarm measurements respectively. From this description, it will be apparent to one skilled in the art that the false alarm probabilities for individual measurements, the relation between the individual measurements and the probability distribution for the measurements as false alarms or non-false alarms can be used to compute the posterior probability of the solution being a false alarm.

In one embodiment of the present invention, the threshold for measurement reliability is reduced so that less reliable measurements are used in position determination. This can improve the sensitivity without compromising the final reliability of the position solution. For example, when a high measurement reliability threshold is used, there may be only three measurements available, not enough for the determination of a portion. However, when the threshold is slightly lowered, addition two or more measurements may become available. Making use of the false alarm probabilities of the additional measurements and the relation of the measurements (e.g., a measurement of the closeness of the measurement, such as a distance between a position solution obtained using one of the low reliability measurements with the three high reliability measurements and another position solution obtained using another one of the low reliability measurements with the three high reliability measurements), one can determine whether or not the relation between the measurements improves the posterior probability of the measurements as false alarms to a level such that the reliability of the final solution is not compromised.

In one embodiment of the present invention, the a priori measurement false alarm probabilities, those determined before an integrity check is performed, are used in identifying the measurement at fault. For example, when an integrity problem is detected (e.g., using a traditional RAIM/SMO method), a traditional method may be used to identify a faulty measurement based on the redundant measurements. When a lower threshold for measurement false alarm probabilities is used, the chance to have more redundant measurements increases. Further, in one embodiment of the present invention, the a priori false alarm probabilities of the measurements are also used in identifying the faulty measurement. In one embodiment of the present invention, the traditional measure for determining the faulty measurement (e.g., a geometry based metric) is combined with the a priori false alarm probabilities to determine an indicator for identifying the faulty measurement. For example, the traditional measure may be weighted by the a priori false alarm probabilities to determine the faulty measurement. When both the geometry based metric and the a priori false alarm probability indicators are expressed in terms of probabilities, these probabilities can be combined (e.g., multiplied) to generate an indicator so that the measurement with the worst indicator is removed. Alternatively, a threshold may be used to identify the faulty measurement if the traditional metric for one of the measurements is worse than the threshold; however, when the traditional method fails to identify the faulty measurement (e.g., when all values are bellow the threshold), the faulty one is then identified according to the a priori false alarm probabilities. From this description, one skilled in the art can envision many combinations and variations of the methods to use the a priori measurement false alarm probabilities in identifying and eliminating faulty measurements.

In one embodiment of the present invention, even when no integrity problem is detected (e.g., by a traditional RAIM method), the individual measurement reliability values, the geometry, and internal consistency are combined to determine the likelihood that the final solution fits its Gaussian error estimate, or is a false alarm position report. When the false alarm probability of a calculated position is low enough, the calculated position can be reported to the end user. Alternatively, the calculated position can be reported to the end user with the reliability indicator (e.g., regardless of the reliability level of the position solution).

Figure 7:
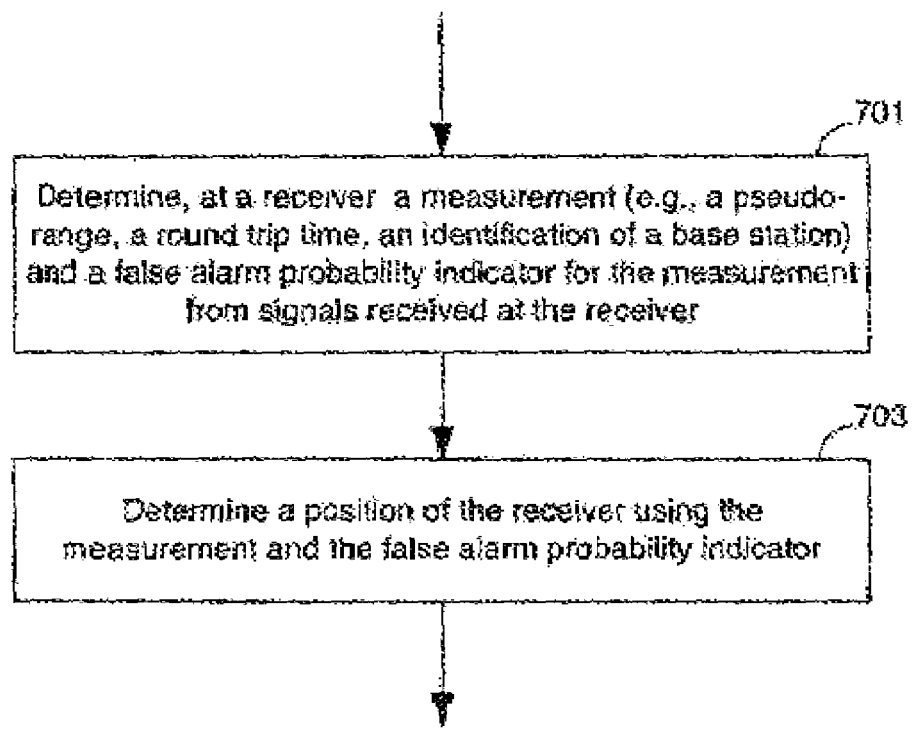
FIG. 7 shows a method to determine the position of a receiver according to one embodiment of the present invention.

FIG. 7 shows a method to determine the position of a receiver according to one embodiment of the present invention. Operation 701 determines, at a receiver, a measurement (e.g., a pseudo-range, a round trip time, an identification of a base station) and a false alarm probability indicator for the measurement from signals received at the receiver. In one embodiment of the present invention, each individually measurement has an associated false alarm probability determined based on received signals (e.g., magnitude of the correlation peak, correlation peak shape/width, signal strength, signal to noise ratio, signal to interference ratio, a relationship of a correlation peak used for the determination of the measurement with other candidate peaks, such as peak ratio, peak interval, and relationship of the GPS signal for the determination of the measurement with other detected GPS signals). In one embodiment of the present invention, a false alarm probability indicator shows the reliability of the measurement in one of a predetermined number of levels. In one embodiment, the false alarm probability indicator is a number in the range [0,1]. In one embodiment of the present invention, the receiver determines the false alarm probability indicator based on the signal quality indicators (e.g., magnitude of the correlation peak, correlation peak width, signal strength, signal to noise ratio, signal to interference ratio, relationship with other candidate peaks, and relationship with other GPS signals detected) using a pre-determined formula (e.g., an empirical formula based on statistical data, or one based on numerical/analytical probability analysis). Alternatively, the receiver can transmit one or more signal quality indicators to a remote server, which determines and/or improves the false alarm probability for the measurement based on the signal quality indicators. Operation 703 determines a position of the receiver using the measurement and the false alarm probability indicator. In one embodiment of the present invention, the false alarm probability indicator is used to determine the reliability of the position solution that is based on the measurement (or the reliability of the redundant measurements as a set). In another embodiment of the present invention, the false alarm probability indicator is used to select a faulty measurement when an integrity problem is detected (e.g., when there is inconsistency among the measurements used in determining the position). Further, in one embodiment of the present invention, the range over which a false alarm may occur is also determined. Different sources for false alarms may have different distributions over different ranges, which may be determined or improved at a remote server. In one embodiment of the present invention, the risk of a particular type of false alarm condition is identified to better identify the false alarm distribution, which is used in testing the consistency of measurements, determining whether an alignment of low reliability measurements is consistent.

Figure 8:
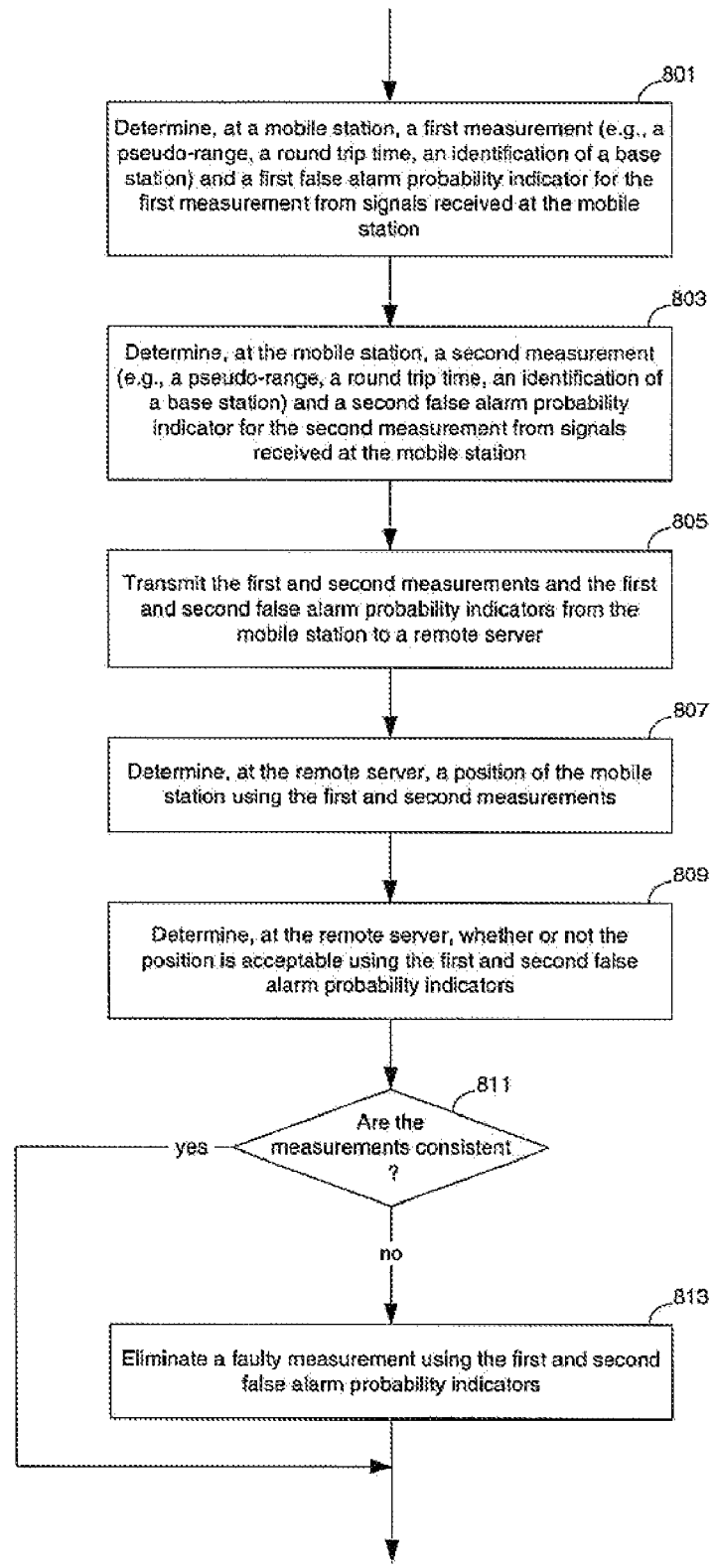
FIG. 8 shows a detailed method to determine the position of a mobile station according to one embodiment of the present invention.

FIG. 8 shows a detailed method to determine the position of a mobile station according to one embodiment of the present invention. Operation 801 determines, at a mobile station, a first measurement (e.g., a pseudo-range, a round trip time, an identification of a base station) and a first false alarm probability indicator for the first measurement from signals received at the mobile station. Operation 803 determines, at the mobile station, a second measurement (e.g., a pseudo-range, a round trip time, an identification of a base station) and a second false alarm probability indicator for the second measurement from signals received at the mobile station. Operation 805 transmits the first and second measurements and the first and second false alarm probability indicators from the mobile station to a remote server. Operation 807 determines, at the remote server, a position of the mobile station using the first and second measurements. Operation 809 determines, at the remote server, whether or not the position is acceptable using the first and second false alarm probability indicators. For example, the first and second false alarm probability indicators are combined to determine the reliability of the position solution. If operation 811 determines that the measurements are not consistent, when redundant measurements are available for autonomous integrity monitoring, operation eliminates a faulty measurement using the first and second false alarm probability indicators. For example, the first and second false alarm probability indicators are used in determining which one of the first and second measurements is faulty. For example, the inconsistency indicators of traditional methods for the first and second measurements are weighted respectively according to the first and second false alarm probability indicators in identifying and eliminating the faulty measurement.

Figure 9:
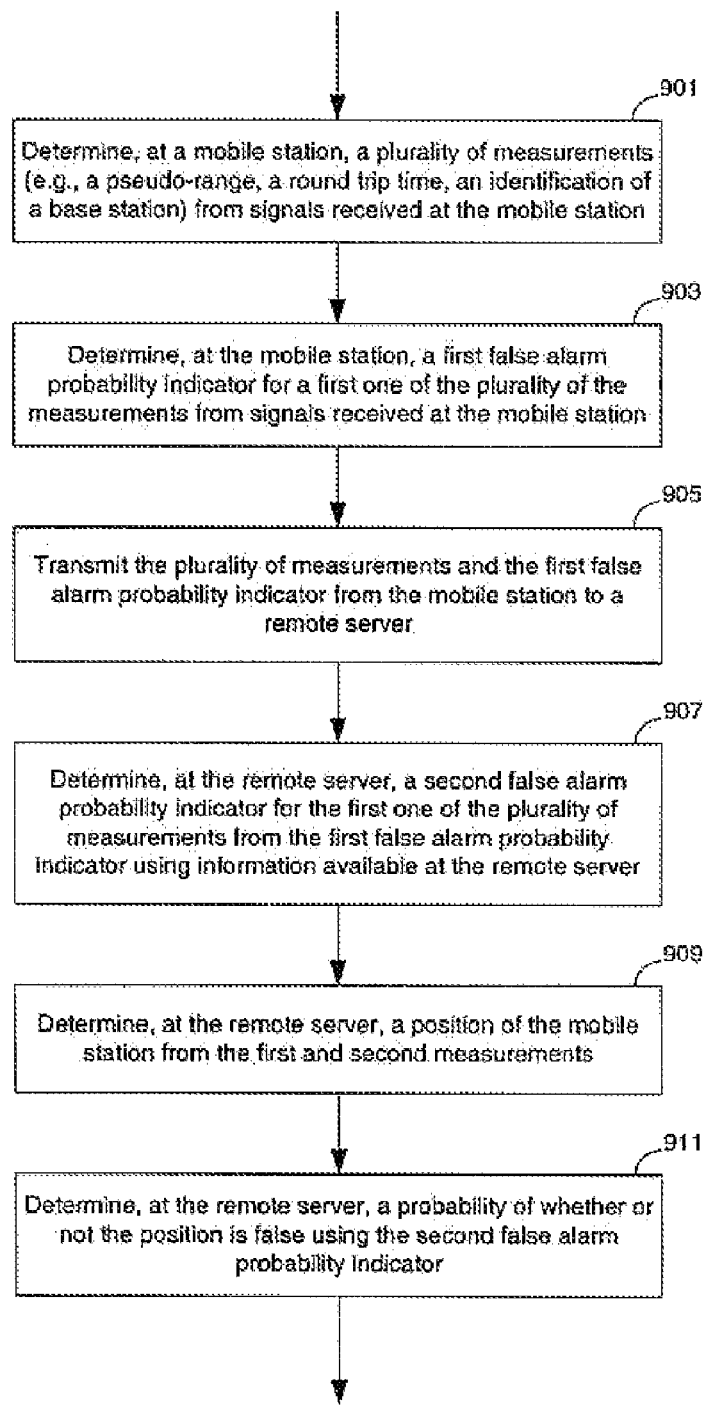
FIG. 9 shows another detailed method to determine the position of a mobile station according to one embodiment of the present invention.

FIG. 9 shows another detailed method to determine the position of a mobile station according to one embodiment of the present invention. Operation 901 determines, at a mobile station, a plurality of measurements (e.g., a pseudo-range, a round trip time, an identification of a base station) from signals received at the mobile station. Operation 903 determines, at the mobile station, a first false alarm probability indicator for a first one of the plurality of the measurements from signals received at the mobile station. Operation 905 transmits the plurality of measurements and the first false alarm probability indicator from the mobile station to a remote server. Operation 907 determines, at the remote server, a second false alarm probability indicator for the first one of the plurality of measurements from the first false alarm probability indicator using information available at the remote server. For example, the server may maintain a statistical data about the false alarms as a function of the indicators provided by the receiver, which can be used to refine the probability of the measurement false alarms. Further, the server may accumulate and improved the statistical data based the information collected during the position determination service. Operation 909 determines, at the remote server, a position of the mobile station from the first and second measurements. Operation 911 determines, at the remote server, a probability of whether or not the position is false using the second false alarm probability indicator. Further, when redundant measurements are not inconsistent, the second false alarm probability indicator can be used in eliminating the faulty measurement.

Thus, the methods of the present invention allow improved reliability. The measurement that is most likely to be a false alarm can be more reliably selected. A specific metric can be provided with the solution to indicate the reliability of the solution based on a priori false alarm probability indicators. Further, the methods of the present invention allow improved sensitivity and availability. Lower thresholds may be used for the individual measurements so that the chance of having the minimum number of measurements or more for the position determination is increased. Since the combination of lower reliability measurements may be determined to have a high reliability final solution, this allows greater availability of GPS and AFLT measurements and more frequent accurate solutions. Embodiments of the present invention include the process of estimating the false alarm probability of a given measurement at the mobile by examining the characteristics of the selected signals. These characteristics may include signal strength, correlation peak shape, relationship with other candidate peaks, and relationship with other GPS signals detected.

Figure 2:
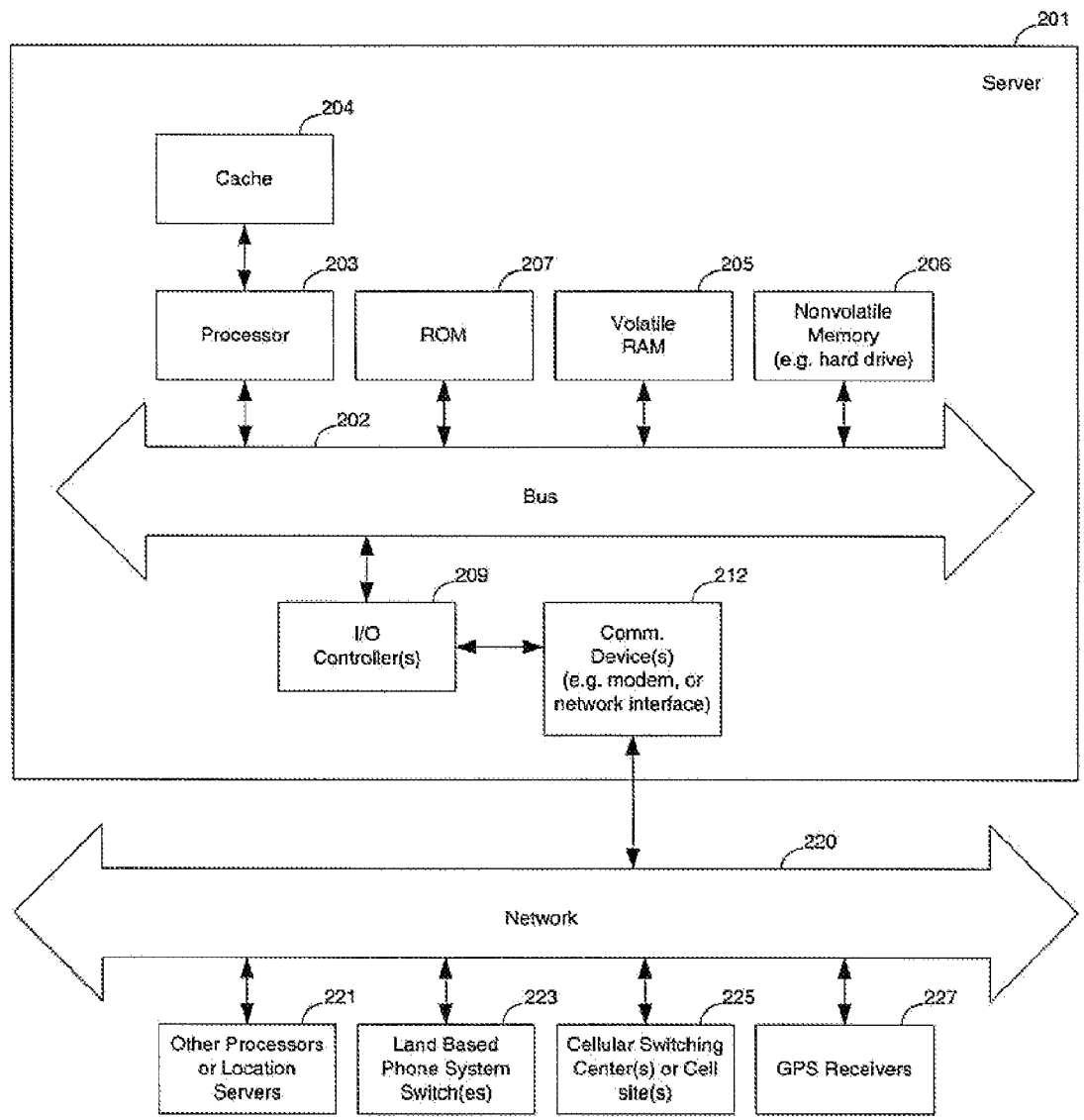
FIG. 2 shows an example of a server which may be used with the present invention.

FIG. 2 shows an example of a data processing system which may be used as a server in various embodiments of the present invention. For example, as described in U.S. Pat. No. 5,841,396, the server (201) may provide assistance data such as Doppler or other satellite assistance data to the GPS receiver in a mobile station. In addition, or alternatively, the location server may perform the final position calculation rather than the mobile station (after receiving pseudoranges or other data from which pseudoranges can be determined from the mobile station) and then may forward this position determination result to the base station or to some other system. The data processing system as a location server typically includes communication devices 212, such as modems or network interface. The location server may be coupled to a number of different networks through communication devices 212 (e.g., modems or other network interfaces). Such networks include the cellular switching center or multiple cellular switching centers 225, the land based phone system switches 223, cellular base stations (not shown in FIG. 2), other GPS signal receivers 227, or other processors or location servers 221.

Multiple cellular base stations are typically arranged to cover a geographical area with radio coverage, and these different base stations are coupled to at least one mobile switching center, as is well known in the prior art (e.g., see FIG. 1). Thus, multiple base stations would be geographically distributed but coupled together by a mobile switching center. The network 220 may be connected to a network of reference GPS receivers which provide differential GPS information and may also provide GPS ephemeris data for use in calculating the position of mobile systems. The network is coupled through the modem or other communication interface to the processor 203. The network 220 may be connected to other computers or network components. Also network 220 may be connected to computer systems operated by emergency operators, such as the Public Safety Answering Points which respond to 911 telephone calls. Various examples of methods for using a location server have been described in numerous U.S. patents, including: U.S. Pat. Nos. 5,841,396, 5,874,914, 5,812,087 and 6,215,442.

The location server 201, which is a form of a data processing system, includes a bus 202 which is coupled to a microprocessor 203 and a ROM 207 and volatile RAM 205 and a non-volatile memory 206. The processor 203 is coupled to cache memory 204 as shown in the example of FIG. 2. The bus 202 interconnects these various components together. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers and/or adapters as is well known in the art. In many situations the location server may perform its operations automatically without human assistance. In some designs where human interaction is required, the I/O controller 209 may communicate with displays, keyboards, and other I/O devices.

Note that while FIG. 2 illustrates various components of a data processing system, it is not intended to represent any particular architecture or manner of interconnecting the components as such details are not germane to the present invention. It will also be appreciated that network computers and other data processing systems which have fewer components or perhaps more components may also be used with the present invention and may act as a location server or a PDE.

In some embodiments, the methods of the present invention may be performed on computer systems which are simultaneously used for other functions, such as cellular switching, messaging services, etc. In these cases, some or all of the hardware of FIG. 2 would be shared for several functions.

It will be apparent from this description that aspects of the present invention may be embodied, at least in part, in software. That is, the techniques may be carried out in a computer system or other data processing system in response to its processor executing sequences of instructions contained in memory, such as ROM 207, volatile RAM 205, non-volatile memory 206, cache 204 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processor 203.

A machine readable medium can be used to store software and data which when executed by a data processing system causes the system to perform various methods of the present invention. This executable software and data may be stored in various places including for example ROM 207, volatile RAM 205, non-volatile memory 206 and/or cache 204 as shown in FIG. 2. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Figure 3:
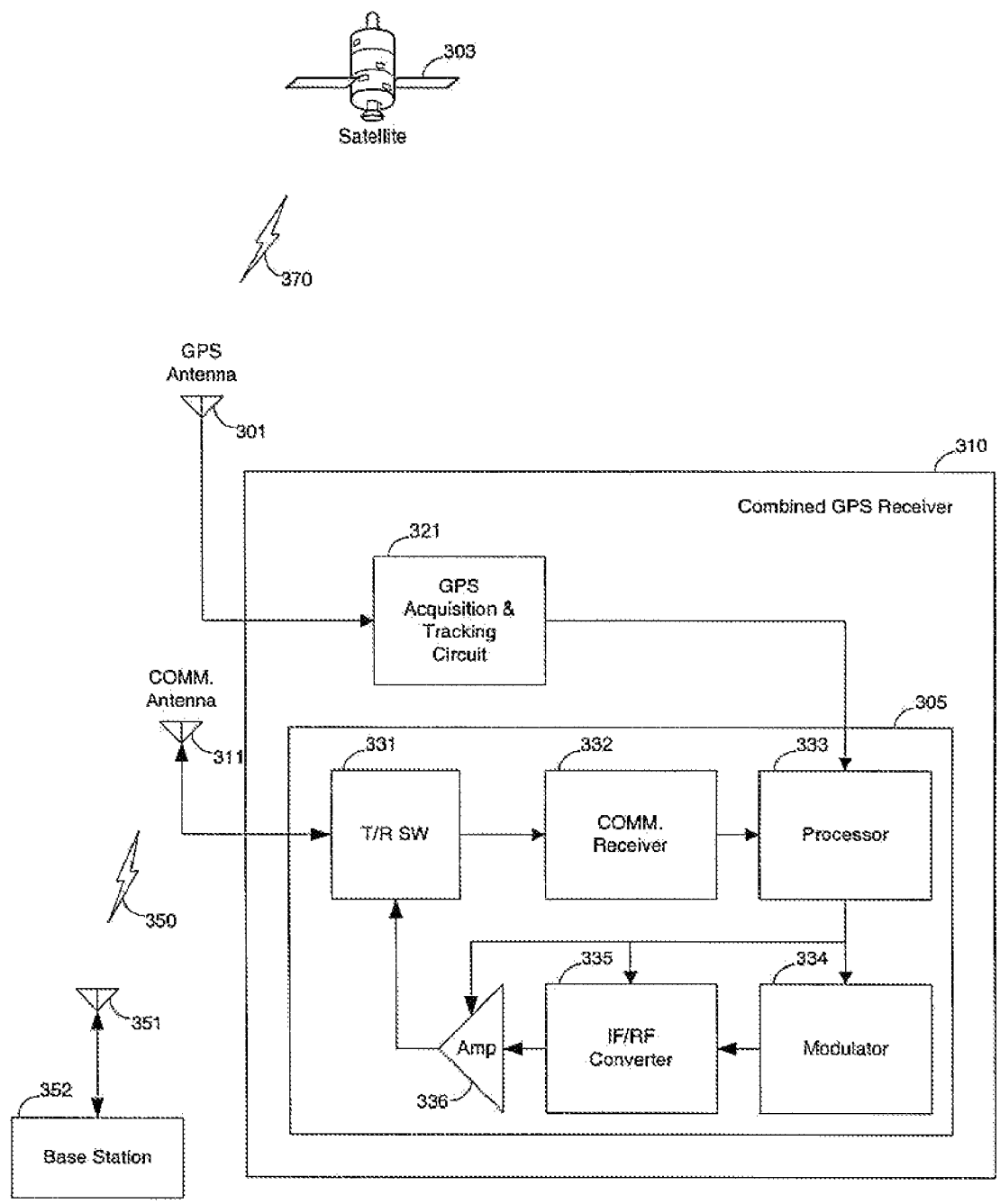
FIG. 3 shows a block diagram representation of a mobile station according to one embodiment of the present invention.

FIG. 3 shows a block diagram representation of a mobile station according to one embodiment of the present invention. The mobile station comprises a portable receiver, which combines a communication transceiver with GPS receiver for use in one embodiment of the present invention. The combined mobile unit 310 includes circuitry for performing the functions required for processing GPS signals as well as the functions required for processing communication signals received through a communication link. The communication link, such as communication link 350, is typically a radio frequency communication link to another component, such as base station 352 having communication antenna 351.

Portable receiver 310 is a combined GPS receiver and a communication receiver and transmitter. Receiver 310 contains a GPS receiver stage including acquisition and tracking circuit 321 and communication transceiver section 305. Acquisition and tracking circuit 321 is coupled to GPS antenna 301, and communication transceiver 305 is coupled to communication antenna 311. GPS signals (e.g., signal 370 transmitted from satellite 303) are received through GPS antenna 301 and input to acquisition and tracking circuit 321 which acquires the PN (Pseudorandom Noise) codes for the various received satellites. The data produced by circuit 321 (e.g., correlation indicators) are processed by processor 333 for transmittal by transceiver 305. Communication transceiver 305 contains a transmit/receive switch 331 which routes communication signals (typically RF) to and from communication antenna 311 and transceiver 305. In some systems, a band splitting filter, or "duplexer," is used instead of the T/R switch. Received communication signals are input to communication receiver 332 and passed to processor 333 for processing. Communication signals to be transmitted from processor 333 are propagated to modulator 334 and frequency converter 335. Power amplifier 336 increases the gain of the signal to an appropriate level for transmission to base station 352.

In one embodiment of the present invention, the combined receiver determines one or more signal quality indicators (e.g., magnitude of the correlation peak, correlation peak width, signal strength, signal to noise ratio, signal to interference ratio, relationship with other candidate peaks, and relationship with other GPS signals detected) for the determination of the a measurement false alarm probability indicator for a measurement (e.g., a pseudorange) obtained at the receiver. In one embodiment, the combined receiver transmits the signal quality indicators to the base station for the determination of the measurement false alarm probability for the measurement. In one embodiment, processor 333 determines the false alarm probability according to a formula based on the indicators and transmits the probability with the measurement to the base station through the communication link 351. In one embodiment, the GPS acquisition and tracking circuit 321 has an Automatic Gain Control (AGC) system that adjusts the gain lineup, which may be analog or digital, such that there is a known total power at the output of the analog to digital converter. From the gain of the signal at the input, the distribution of the signal (e.g., Gaussian) and the signal processing (e.g., by processor 333), the correlation threshold is related to the false alarm probability (e.g., through collecting statistical data or through numerical simulation or theoretically analysis). Numerical simulations or theoretically analyses typically depend on the signal processing methods used. For example, in one embodiment, spurious signals when processing a weak received satellite signal due to interference by a stronger received signal are reduced by estimating certain characteristics of the stronger signal, creating an interference waveform based on these estimated characteristics, and subtracting this interference waveform from a set of correlation outputs for the weaker signal to remove the interference effects of the stronger signal. More details about the mobile station for reducing interference in a mobile station can be found in U.S. Pat. No. 6,236,354. When additional signal processing operations are used to reduce false alarms (or for other purpose), additional simulation operations or analyses are performed to correlate the signal quality indicators and the false alarm indicators.

In one embodiment of the present invention, communication transceiver section 305 is capable to use communication signals (e.g., in the communication link 350) to extract timing indicators (e.g., timing frames or system time) or to calibrate the local oscillator (not shown in FIG. 3) of the mobile station. More details about the mobile station for extracting timing indicators or calibrating the local oscillator can be found in U.S. Pat. Nos. 5,874,914 and 5,945,944.

In one embodiment of the combined GPS/communication system of receiver 310, data generated by acquisition and tracking circuit 321 is transmitted over communication link 350 to base station 352. Base station 352 then determines the location of receiver 310 based on the data from the remote receiver, the time at which the data were measured, and ephemeris data received from its own GPS receiver or other sources of such data. The location data can then be transmitted back to GPS receiver 310 or to other remote locations. More details about portable receivers utilizing a communication link are disclosed in commonly assigned U.S. Pat. No. 5,874,914.

In one embodiment of the present invention, the combined GPS receiver includes (or is coupled to) a data processing system (e.g., a personal data assistant, or a portable computer). The data processing system includes a bus which is coupled to a microprocessor and a memory (e.g., ROM, volatile RAM, non-volatile memory). The bus interconnects various components together and also interconnects these components to a display controller and display device and to peripheral devices such as input/output (I/O) devices, which are well known in the art. The bus may include one or more buses connected to each other through various bridges, controllers and/or adapters as is well known in the art. In one embodiment, the data processing system includes communication ports (e.g., a USB (Universal Serial Bus) port, a port for IEEE-1394 bus connection). In one embodiment of the present invention, the mobile station transmits the measurements and the a priori false alarm probabilities for the measurements (or signal quality indicators) to the data processing system (e.g., through an I/O port) so that the data processing system can determine the position of the receiver and the reliability of the position solution.

Although the methods and apparatus of the present invention have been described with reference to GPS satellites, it will be appreciated that the description are equally applicable to positioning systems which utilize pseudolites or a combination of satellites and pseudolites. Pseudolites are ground based transmitters which broadcast a PN code (similar to a GPS signal), typically modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar satellite positioning systems, and in particular, the Russian GLONASS system and the proposed European Galileo System. The GLONASS system primarily differs from GPS system in that the emissions from different satellites are differentiated from one another by utilizing slightly different carrier frequencies, rather than utilizing different pseudorandom codes. In this situation substantially all the circuitry and algorithms described previously are applicable. The term "GPS" used herein includes such alternative satellite positioning systems, including the Russian GLONASS system.

Although the operations in the above examples are illustrated in specific sequences, from this description, it will be appreciated that various different operation sequences and variations can be used without having to be limited to the above illustrated examples.

The above examples are illustrated without presenting some of the details known in the art; these details can be found in the publications, such as U.S. Pat. Nos. 5,812,087, 5,841,396, 5,874,914, 5,945,944, 5,999,124, 6,061,018, 6,208,290, and 6,215,442, 6,236,354, all of which are hereby incorporated here by reference, as pointed out in the above discussion.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of position determination for a mobile station, the method comprising:
   determining a plurality of measurements for position determination for the mobile station from position determination signals received at the mobile station;
   estimating a probability that each of the plurality of measurements is a false alarm to produce a plurality of probability estimates before determining a consistency among the plurality of measurements;
   determining a reliability indicator for each of the plurality of probability estimates to produce a plurality of reliability indicators;
   combining the plurality of reliability indicators to determine a reliability level of a position determined for the mobile station using the plurality of measurements; and
   determining whether to eliminate at least one of the plurality of measurements using at least one of the plurality of reliability indicators in response to determining the consistency among the plurality of measurements.

2. The method of claim 1, further comprising:
   calculating the position for the mobile station using the plurality of measurements.

3. The method of claim 1, wherein each of the plurality of reliability indicators is a value of more than two levels.

4. The method of claim 3, wherein each of the plurality of reliability indicators is a number within a range.

5. The method of claim 1, further comprising:
determining one of the plurality of reliability indicators from one or more signal quality indicators; wherein the one or more signal quality indicators comprises one of:
a) magnitude of a correlation peak; b) correlation peak shape indicator; c) signal strength; d) signal to noise ratio; and e) signal to interference ratio.

6. A machine readable medium containing executable computer program instructions which when executed by a data processing system cause the system to perform a method of position determination for a mobile station, the method comprising:
determining a plurality of measurements for positIon determination for the mobile station from position determination signals received at the mobile station;
estimating a probability that each of the plurality of measurements is a false alarm to produce a plurality of probability estimates before determining a consistency among the plurality of measurements;
determining a reliability indicator for each of the plurality of probability estimates to produce a plurality of reliability indicators;
combining the plurality of reliability indicators to determine a reliability level of a position determined for the mobile station using the plurality of measurements; and
determining whether to eliminate at least one of the plurality of measurements using at least one of the plurality of reliability indicators in response to determining the consistency among the plurality of measurements.

7. The medium of claim 6, wherein the method further comprises:
calculating the position for the mobile station using the plurality of measurements.

8. The medium of claim 6, wherein each of the plurality of reliability indicators is a value of more than two levels.

9. The medium of claim 8, wherein each of the plurality of reliability indicators is a number within a range.

10. The medium of claim 6, wherein the method further comprises:
determining one of the plurality of reliability indicators from one or more signal quality indicators; wherein the one or more signal quality indicators comprises one of:
a) magnitude of a correlation peak; b) correlation peak shape indicator; c) signal strength; d) signal to noise ratio; and e) signal to interference ratio.

11. A data processing system for position determination for a mobile station, the data processing system comprising:
means for determining a plurality of measurements for position determination for the mobile station from position determination signals received at the mobile station;
means for estimating a probability that each of the plurality of measurements is a false alarm to produce a plurality of probability estimates before determining a consistency among the plurality of measurements;
means for determining a reliability indicator for each of the plurality of probability estimates to produce a plurality of reliability indicators;
means for combining the plurality of reliability indicators to determine a reliability level of a position determined for the mobile station using the plurality of measurements; and
means for determining whether to eliminate at least one of the plurality of measurements using at least one of the plurality of reliability indicators in response to determining the consistency among the plurality of measurements.

12. The data processing system of claim 11, further comprising:
means for calculating the position for the mobile station using the plurality of measurements.

13. The data processing system of claim 11, wherein each of the plurality of reliability indicators is a value of more than two levels.

14. The data processing system of claim 13, wherein each of the plurality of reliability indicators is a number within a range.

15. The data processing system of claim 11, further comprising:
means for determining one of the plurality of reliability indicators from one or more signal quality indicators; wherein the one or more signal quality indicators comprises one of:
a) magnitude of a correlation peak; b) correlation peak shape indicator; c) signal strength; d) signal to noise ratio; and e) signal to interference ratio.

16. A data processing system for position determination for a mobile station, the data processing system comprising:
a memory to store a plurality of measurements, a plurality of probability estimates, and a plurality of reliability indicators; and
a processor coupled to the memory, the processor
determining a plurality of measurements for position determination for the mobile station from position determination signals received at the mobile station;
estimating a probability that each of the plurality of measurements is a false alarm to produce a plurality of probability estimates before determining a consistency among the plurality of measurements;
determining a reliability indicator for each of the plurality of probability estimates to produce a plurality of reliability indicators;
combining the plurality of reliability indicators to determine a reliability level of a position determined for the mobile station using the plurality of measurements; and
determining whether to eliminate at least one of the plurality of measurements using at least one of the plurality of reliability indicators in response to determining the consistency among the plurality of measurements.

17. The data processing system of claim 16, wherein the processor further calculates the position for the mobile station using the plurality of measurements.

18. The data processing system of claim 16, wherein each of the plurality of reliability indicators is a value of more than two levels.

19. The data processing system of claim 18, wherein each of the plurality of reliability indicators is a number within a range.

20. The data processing system of claim 16, wherein the processor further detennines one of the plurality of reliability indicators from one or more signal quality indicators; wherein the one or more signal quality indicators comprises one of:
a) magnitude of a correlation peak; b) correlation peak shape indicator; c) signal strength; d) signal to noise ratio; and e) signal to interference ratio.

* * * * *

UNITED STATES PATENT AND TRADEMARK OFFICE
CERTIFICATE OF CORRECTION

PATENT NO. : 7,446,706 B2
APPLICATION NO. : 11/608163
DATED : November 4, 2008
INVENTOR(S) : Wyatt T. Riley et al.

It is certified that error appears in the above-identified patent and that said Letters Patent is hereby corrected as shown below:

in column 18, Claim 20, line 58, "detennies", should be --determines--

Signed and Sealed this

Twenty-first Day of September, 2010

David J. Kappos
*Director of the United States Patent and Trademark Office*